Sept. 22, 1931.  H. E. ARMSTEAD  1,824,030
SIMULTANEOUS CAMERA EXPOSURE AND FLASH
Filed Oct. 6, 1928   2 Sheets-Sheet 1
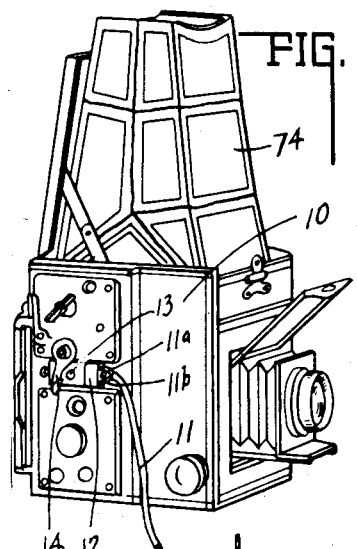
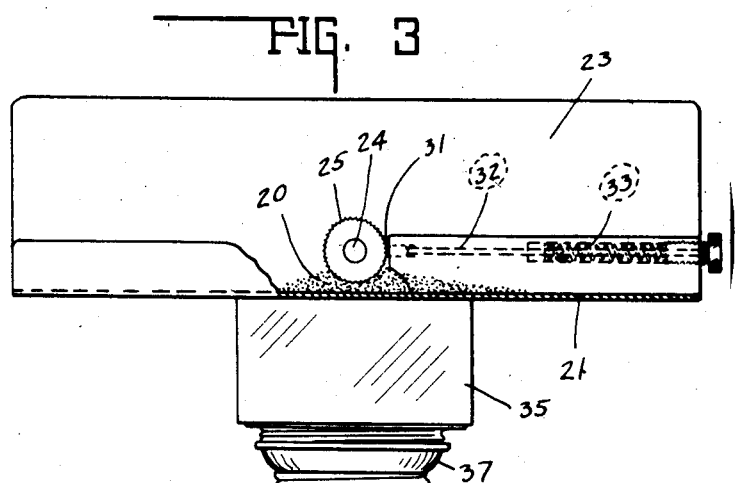
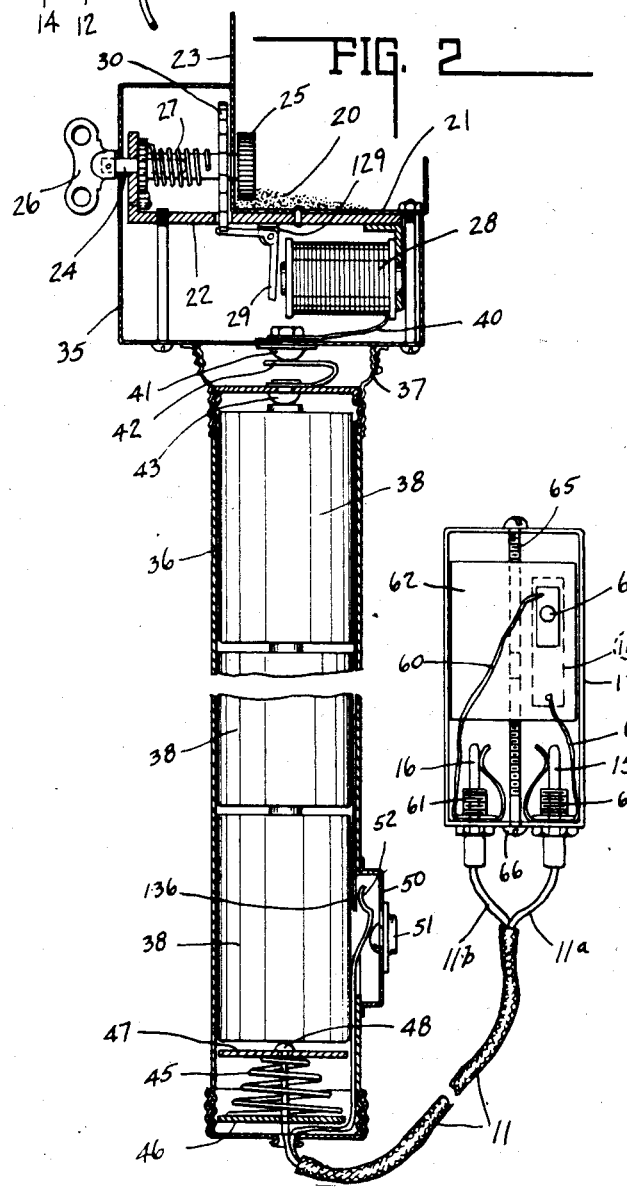
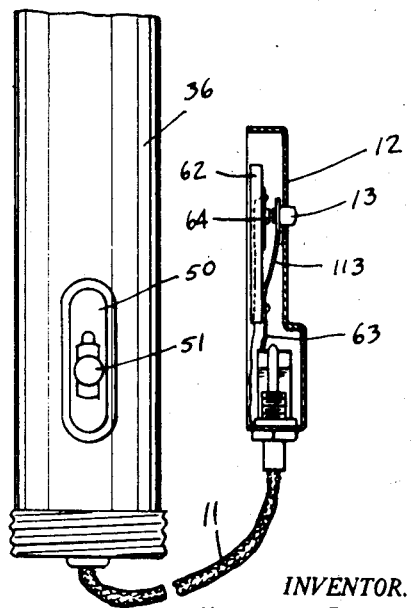
INVENTOR.
HARRY E. ARMSTEAD.
ATTORNEYS.

Sept. 22, 1931.                H. E. ARMSTEAD                1,824,030
                    SIMULTANEOUS CAMERA EXPOSURE AND FLASH
                    Filed Oct. 6, 1928           2 Sheets-Sheet 2
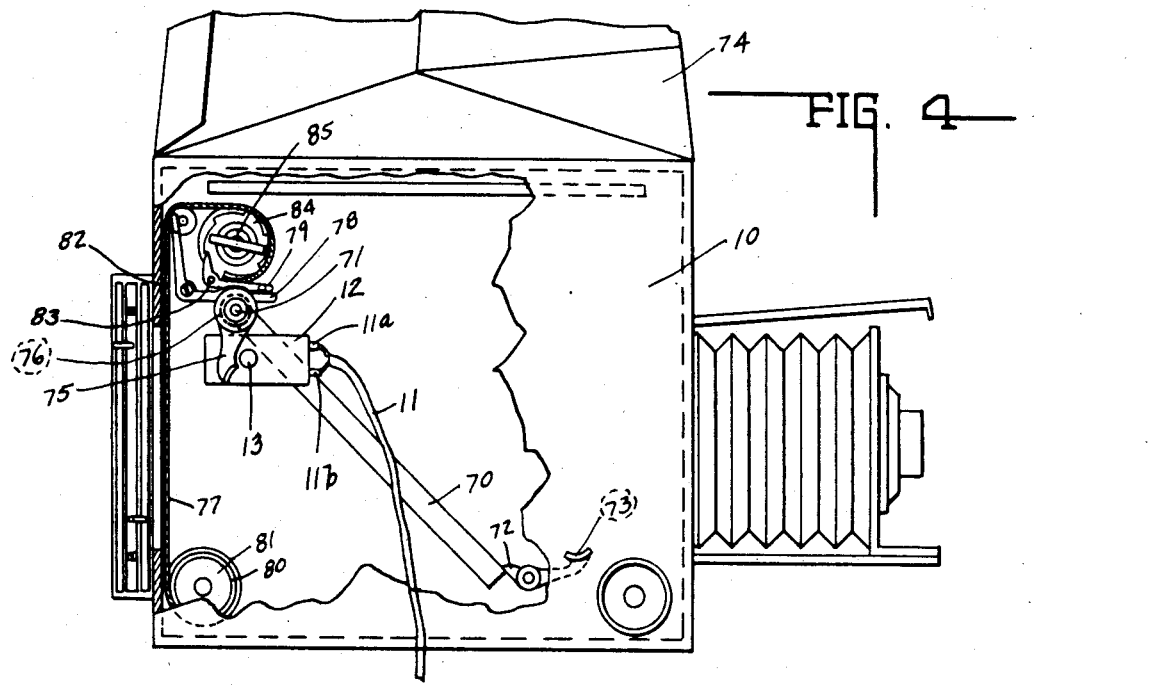
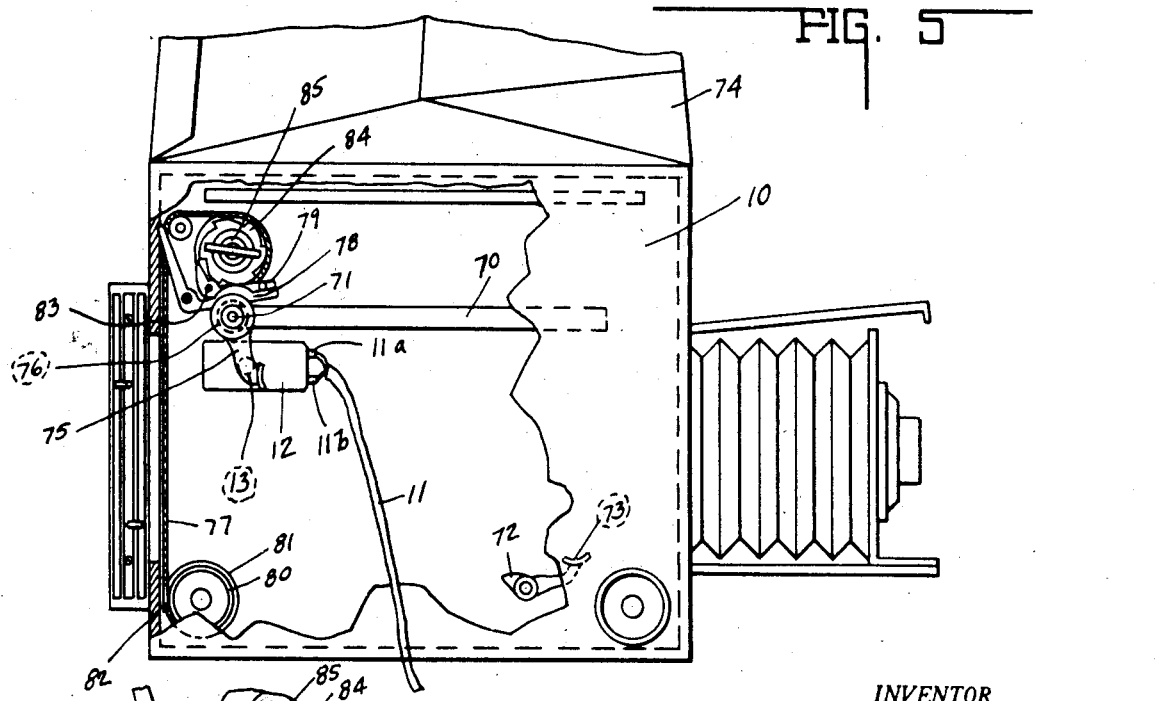
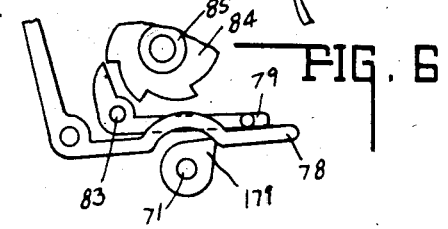
INVENTOR.
HARRY E. ARMSTEAD.
ATTORNEYS.

Patented Sept. 22, 1931

1,824,030

UNITED STATES PATENT OFFICE

HARRY E. ARMSTEAD, OF INDIANAPOLIS, INDIANA.

SIMULTANEOUS CAMERA EXPOSURE AND FLASH

Application filed October 6, 1928. Serial No. 310,701.

This invention is an improvement in portable flash light apparatus for photographic cameras adapted to be associated with a camera for causing an actually simultaneous flash and camera exposure.

The primary object of the invention is to avoid any time lag between the flash and the camera exposure. Apparatus has heretofore been provided wherein the flash causes the shutter release in the camera, and also wherein pneumatic means causes the flash and releases the shutter. But in such apparatus there is an appreciable time lag and the time lag is sought to be overcome by this invention.

The chief feature of this invention consists in providing a flash light apparatus with electric means for causing the flash including an electric circuit adapted to be connected with any make of camera without change therein so that some mechanical means in the camera, such as the shutter releasing means or mirror re-setting means, automatically closes the circuit and releases the means for igniting the powder to cause the flash. This causes a really simultaneous action of the flash light apparatus and the camera exposure free from any appreciable time lag, because the current travels the length of the circuit instantaneously with the speed of light, which is not true in the movement of air in pneumatic tubes or in the pull of a cord. Unless the flash and camera exposure are actually simultaneous, naturally the picture taken will be imperfect. Usually either the flash precedes the camera exposure or follows it, because the flash is substantially instantaneous and the shutter action exposure is also substantially instantaneous, and, unless they are actually simultaneous, one will necessarily precede the other and the flash will be over and nothing but smoke left when the camera exposure takes place, or the exposure will be over before the flash occurs.

Another feature of the invention consists in the means for releasing the pictorial means for causing the flash when the shutter is released and not before, so that the flash and the exposure will be actually simultaneous. This is important in the use of a camera which is employed by newspaper reporters and others for taking photographs. In such cameras a reflecting mirror is used for viewing the object before the camera exposure. In the device shown herein to illustrate this invention, an arm on the mirror shaft is moved upon the release of the mirror toward the switch of said electric circuit and at the moment said switch is closed, said means releases the shutter so that the flash and exposure will be actually simultaneous. The switch, therefore, is not closed at the beginning of the operation of the camera but after the beginning and at the moment of the release of the shutter. There is, theoretically, infinitesimal time required for the shutter movement but it is substantially the same as the time required for the ignition of the flash light material, so that the exposure and the flash are actually simultaneous. That this is so in this apparatus is evidenced by the fact that it will take a picture with a light background substantially as clear and defined as if taken with a dark background. In other words, it will operate in a room in day-time with the window curtains elevated, which would be impossible unless the exposure and flash were actually simultaneous. The prior patents may have called attention to this need and this ideal result, but none of them could accomplish it for the reasons above stated.

Another feature of this invention is that the wiring forming the electrical connection or circuit between the flash and the camera may be relatively long,—50 or 100 feet, or more,—so that, if desired, the flash light apparatus and the camera may be rather far apart while taking pictures. At the same time, the electrical connection is such that the camera and flash light apparatus can be operated by one person.

Another feature of the invention is that the electrical connection from the flash light apparatus is readily secured to any form or type of camera without any changes in the construction of the camera; and it is also readily removable therefrom for purposes of packing or transportation if desired. The switch may be mounted on the camera and the wiring plugged into the switch so as to be readily connected with and as readily disconnected from the switch and camera.

Another advantage of this arrangement is that the flash is operated by the camera and in timed relation with the parts of the camera and hence the flash will take place only when the photographer operates the camera and not before he is satisfied that the picture to be taken will be as he wants it, or when the objects of the proposed photograph are in proper relative positions. Also, the mere operation of the usual camera is all that is required to operate the flash and do so automatically. The operation of the camera is not altered or varied because of its connection with the flash light apparatus. Also, the camera and flash light apparatus are portable by one person or by two persons, as desired.

It is noted also that in this invention the operator has nothing to do with the operation of the flash light apparatus. He merely operates his camera in the usual way,—that is, releases or resets the mirror or shutter and the camera automatically performs the remaining operation thereof and also operates the flash light apparatus. In fact, the flash light apparatus can be located anywhere, if electrically connected with the camera, so the operator can choose any position and time to operate the camera, and when he does operate the camera, it will automatically cause the flash.

The full nature of the invention will be understood from the accompanying drawings and the following description and claims:

In the drawings Fig. 1 is a perspective view of a camera with the electrical flash light connection in place and parts ready to take a picture. Fig. 2 is a central vertical section through the flash light apparatus and showing the switch attachment for the camera in elevation, parts being centrally broken away. Fig. 3 is a front elevation of the flash light apparatus with the switch attachment shown in the side view, parts being centrally broken away. Fig. 4 is a vertical longitudinal section through a camera with the parts in position before taking a picture. Fig. 5 is a similar section with the parts in their position after the mirror is elevated out of the way, the shutter is released and the electric circuit of the flash light apparatus is closed. Fig. 6 is an enlarged view of parts of the shutter releasing mechanism, shown in side elevation.

There is shown in Fig. 1 a camera 10 in position preliminary to taking a photograph. An electrical circuit 11 composed of the wires 11—a and 11—b is shown with a switch plate 12 attached to the camera and having a terminal pin 13 in position to be engaged by the arm 14 when it has been moved by the camera to the shutter releasing position, as hereafter explained, and so as to close the electric circuit. Aside from the attachment of the switch plate 12 to the camera, the camera need not be otherwise changed. This attachment may be by any desired means, but preferably the switch plate 12 is fixedly secured to the camera and the terminals 15 and 16 of the electric wires are plugged in as shown in Fig. 3, so that it will make a perfect electrical connection for closing the circuit, and yet the wiring and terminals 15 and 16 may be readily pulled out of the switch if desired.

The flash light apparatus shown in Figs. 2 and 3, so far as the broad features of the invention herein are concerned, can be of any desired construction, so long as the flash light material 20 can be ignited by the camera through means operated by an electric circuit including the wiring 11—a and 11—b above mentioned. There is shown herein a flash pan 21 secured upon a plate or support 22 and having a relatively high rear vertical wall 23 through which a shaft 24 extends on which there is a knurled sparking wheel 25 in position to operate in the flash light material. The shaft 24 is also mounted in an upturned rear side wall from the plate 22 and it is turned by a finger piece 26 so as to wind up the spiral spring 27 to place the knurled sparking wheel 25 under tension. The sparking wheel is actuated by the spring 27, when it is released by the solenoid 28 operating the armature lever 29, which is bell crank shaped with one arm held by spring 129 in engagement with the ratchet wheel 30 which is in rigid relation to the sparking wheel 25.

As the solenoid is energized the operation of the armature lever will release the ratchet wheel 30 and the sparking wheel 25 will revolve. The sparking wheel is in frictional contact with a sparking metal plug 31 yieldingly held against the wheel by the rod 32 and the spiral spring 33, as shown in Fig. 3. As the sparking wheel 25 is rotated, a spark will be produced which will ignite the flash light material.

The flash light apparatus has an upper casing 35 enclosing the mechanism heretofore described and mounted upon a battery tube 36 by means of a screw cap connection 37. Within said tube 36 there is shown several dry batteries 38, one above the other in series, and they are electrically connected with the solenoid through the wire 40, binding post 41, spring contact 42 and the binding post 43. The batteries are held against each other by the expansion spring 45 at the lower end of the battery tube 36, said spring resting upon plate 46 and pressing upward against the disk 47 through which a terminal 48 extends that is in connection with the wire 11—a.

There are two switches, the one in plate 12 heretofore referred to and which is the controlling switch, and a safety switch 50 near the lower end of the battery tube 36. It consists of a stationary plate secured on the tube 36 and having a sliding switch button 51 mounted therein adapted to move the spring switch terminal 52 at the end of wire 11—b into engagement with the tube 36 at 136 so as to close the flash light circuit. This safety switch is closed preliminary to taking photographs and remains closed during the time for taking any one series of photographs and at other times it is preferably open.

The only part which is added to the camera is the switch casing 12 having in one end thereof sockets 61 adapted to receive the plug terminals 15 and 16 from the wires 11—a and 11—b that extend to the other electric means for forming the electric circuit for operating the flash light apparatus. In the casing 12 fixedly secured to the camera, as seen in Fig. 1, there is a longitudinally adjustable block of insulation 62 for carrying the switch. On said block there is a spring 113 secured which carries the terminal pin 13, as seen in Fig. 3. The spring 113 is connected by a wire 63 with the socket 61 for wire 11—a. The other terminal 64 is mounted on block 62 and is connected by line 60 with the other socket 61 and wire 11—b. Hence, when the switch pin 13 is depressed from the open position shown in Fig. 3, it will close the circuit and cause a flash. When the flash light apparatus is not in use, the wire 11 and terminals 15 and 16 are withdrawn from the sockets 61 in the casing 12 attached to the camera.

The number of batteries may be such as desired, but ordinarily there will preferably be about six dry batteries. Assuming the upper end of the top battery to be positive and the lower end of the lowest battery to be negative, the circuit passes from the positive terminal of the top battery through the post 43, spring 42, post 41, wire 40, solenoid 28 to the metal casing 35 and 36 and thence through the switch 52 and the wire 11—b, wire 60, terminals 64 and 13, spring 113, wire 63, socket 61, wire 11—a to the terminal 48 at the lower end of the lower battery. However, the electric circuit can be modified within the skill of an electrical expert so far as this invention is concerned.

The switch in casing 12 on the camera is longitudinally adjustable to place the switch pin 13 in the desired position to be acted upon by any operative part of the camera at the desired moment, preferably the moment of the release of the shutter. This adjustment is effected by the screws 65 and 66 extending through opposite ends of the casing 12 and projecting in opposite directions into the insulation block 62 whereby said block may be moved longitudinally of the casing 12 and held in adjusted position.

In order to illustrate the manner of use of this invention, there is shown in Figs. 4 and 5 some of the internal construction of a camera. The flash light apparatus is connected with the camera by the electric circuit 11 which plugs into the switch construction 12. This switch construction is secured here on the outside of the camera with the switch terminal 13 in position to be depressed by any part of the camera for closing the flash light circuit when the camera is operated.

In the camera shown in Figs. 4 and 5 there is a tilting mirror 70 fulcrumed at 71 and held in inclined position by the latch 72, which is tripped by the finger piece 73 when it is desired to take a photograph. When said mirror is in position as shown in Fig. 4, the object to be photographed is viewed through the focusing hood 74, see Fig. 1. There is the usual resetting arm 75 rigidly secured to the shaft 71 which carries the mirror 70. It is used to reset the mirror from the position shown in Fig. 5 to that shown in Fig. 4 and in this form of camera it extends downward and normally to the rear of the switch pin 13 for controlling the electric circuit to the flash light.

When the trip 72 releases the mirror 70, a coil spring 76 on the shaft 71 suddenly throws the mirror up out of the way to the horizontal position shown in Fig. 5 and when the mirror is thus moved to horizontal position, it moves the resetting arm 75 to engage the switch 13 and close the flash light circuit which immediately causes the flash. At the same time, the shutter curtain is released by a cam 171 on the end of the mirror shaft 71 opposite the resetting arm 75 and which lifts bell crank lever 78 and it in turn releases the pawl 79 which holds the shutter 77 stationary against the tension of a spring 80 on the shutter roller 81 and that moves the shutter downward in front of the film or plate and, as the light passes through the opening 82 in the shutter, the photograph is taken. The shutter releasing pawl 79 is on the pivot 83 and engages a notch in ratchet wheel 84 on the top shutter roller 85 upon which the shutter is rolled prior to taking a photograph. The remaining parts of the camera, it is believed, need not be further explained here.

It is noted that by this mechanism the camera does all the work, after the flash light apparatus has been connected with the camera. The operator has merely to release the mirror 70 from the position shown in Fig. 4 by depressing the finger piece 73. The spring removes the mirror out of the path of light from the object and while it is making this movement, there is an appreciable time lag in this type of camera but the flash light apparatus is not operated during that period of time lag. It is only operated at the end of the upper movement of the mirror 70 when the arm 75 then moves upon the switch pin 13 and closes the flash light circuit.

Since the shutter is released at the same moment that the flash light circuit is closed, the exposure and flash are actually simultaneous. The movement of the curtain is so rapid, the average time of movement thereof being one five-hundredths of a second, that the flash will not take place prior to the exposure, as has been the case with prior flash light apparatus wherein the lag was so great that either the flash would have occurred before the exposure or would not occur until after the exposure and no satisfactory picture be obtained. That the foregoing is true of this apparatus is evidenced by the fact that this flash light apparatus will enable a camera to make a very fine and distinct photograph of a person in a room standing against a window in the day time with the window curtain up or with a light background. The slightest variance between the flash and the exposure would prevent this being done. In order that the exposure and flash may be actually simultaneous, the position of the switch pin 13 with reference to the mirror resetting arm 75 which closes the flash light circuit is adjusted by the screws 65 and 66 so that the circuit will be closed at the instant that the shutter is released.

No only is the exposure and flash actually simultaneous, but the flash light apparatus is wholly independent of the operator, after he has connected it with the camera and properly positioned the terminal pin 13 in relation to the mirror resetting arm 75. The photographer does not operate the flash light himself and its operation is not affected by the inaccuracies of the human element. The flash light is wholly operated by the camera, and without changing the camera or its mode of operation. That makes the operation of the flash light always accurate in time, regardless of the operator.

Furthermore, the operation of the flash is not at the beginning of the operation of the camera, but it occurs only at the moment of release of the shutter. Time has been given for the mirror to be moved out of the path of the light of the object before the shutter is released and at that moment the flash light material is ignited by the camera. The use of electric connection between the flash light apparatus and the camera insures a flash practically instantaneous upon the closure of the electric circuit, as the electric current moves as fast as light and faster than air or any other connection between said parts as may heretofore have been employed.

Not only does this flash light apparatus have the advantage above mentioned, but it is a portable apparatus for the purpose, in which the source of the electricity is in the apparatus and portable as well as the electrical connections. The height or elevation of the flash above the camera may be such as desired by raising or lowering the apparatus. Also, the same operator may handle both the flash light apparatus and camera and operate them, or one person can hold the flash light apparatus and another operate the camera at any desired distance away, as the length of the electrical wiring connection may be such as desired for that purpose. The two devices do not have to be located close together and in this way better lighting positions and exposure positions may be obtained.

The apparatus may be placed or located at any position desired and does not require the attention of an operator as it is controlled entirely automatically by the operation of the camera. This is a decided advantage as one person can operate the entire combination of camera and flash even when it is necessary to locate the flash at a distance from the camera. The flash light can be fastened or secured to any support by any means obtainable. The portability of the device is facilitated by the ready separation of the flash light apparatus by merely pulling the plugs 61 of the wiring out of the switch sockets on the camera, and they may be hitched together as readily by merely inserting the plugs in said sockets.

The safety switch 50 contributes to the safety of the apparatus in transportation at which time the said switch is open and is not closed until previous to the actual use of the flash light apparatus. This arrangement renders the flash light apparatus very reliable as there is no air or air tubes or plungers or cords or other mechanism to interfere with the operation of the device or reduce the reliability of it or cause undesirable time lag. The apparatus is also not affected in its operation by changes in atmospheric temperature.

The invention claimed is:

1. In portable flash light apparatus for a photographic camera, means for holding flash light material, means for igniting said material, a solenoid for causing the operation of said igniting means, a casing enclosing the foregoing mechanism, a tube on the end of which said casing is mounted, a battery in said tube for supplying current to said solenoid, an electric circuit adapted to extend to the camera and be energized by said battery, and a switch adapted to be secured to the camera and moved into circuit closing position automatically by the camera in its operation while taking a photograph.

2. Independent portable flash light apparatus for a photographic camera having shutter releasing means, including means for causing the flash, electrical means for releasing the means for causing the flash, said electrical means having circuit wires, a switch mechanism adapted to be secured to the camera and with which said wires may be temporarily connected and having a circuit closing switch member, and means in said switch mechanism for adjusting the position of said circuit closing switch member with respect to the shutter releasing means, so that it can be operated and the circuit closed automatically by the camera at the instant of the releasing of the shutter while taking the photograph, substantially as set forth.

3. Independent portable flash light apparatus for a photographic camera, including frictional means for causing the flash, electrical means for releasing the flash causing means, said electrical means having circuit wires, a manually operated safety switch in said flash light apparatus for controlling said circuit, a switch mechanism adapted to be secured to the camera in position for the switch to be moved into circuit closing position automatically by the camera while taking a photograph and with which said circuit wires are adapted to be temporarily connected, substantially as set forth.

4. Independent portable flash light apparatus for photographic cameras, including frictional means for causing the flash, electrical means for releasing the flash causing means, said electrical means having circuit wires, a battery tube, batteries arranged in said tube in succession with contact points between them, and a spring for holding said batteries in contact position, substantially as set forth.

5. The combination with a photographic camera having a shutter, a mirror, and mirror resetting means operatively associated with the shutter so the operation of the mirror and shutter will be simultaneous, of flash light apparatus including means for causing the flash, and electrical means for operating said flash causing means, said electrical means being connected with the camera in position to be operated automatically by the mirror resetting means thereof in its operation of taking a photograph, substantially as set forth.

6. The combination with a photographic camera having a shutter, of flash light apparatus including means for causing a flash, and electrical means for operating said flash causing means, said electrical means being connected with the camera in position to be operated automatically by the camera in its operation of taking a photograph, said electrical connection with the camera being adjustable in its relation to the movable part thereof.

In witness whereof, I have hereunto affixed my signature.

HARRY E. ARMSTEAD.